United States Patent [15] 3,651,316
Gibson [45] Mar. 21, 1972

[54] AUTOMATIC TRANSVERSAL EQUALIZER SYSTEM

[72] Inventor: Earl D. Gibson, Huntington Beach, Calif.
[73] Assignee: North American Rockwell Corporation
[22] Filed: Oct. 9, 1970
[21] Appl. No.: 79,380

[52] U.S. Cl. ..................................235/152, 333/18, 325/42, 328/162
[51] Int. Cl. ..................................H04b 1/62, H04b 3/04
[58] Field of Search ..................................235/152; 333/18; 325/42; 328/162

[56] References Cited

UNITED STATES PATENTS

| | | | |
|---|---|---|---|
| 3,414,819 | 12/1968 | Lucky | 325/42 |
| 3,414,845 | 12/1968 | Lucky | 333/18 |
| 3,368,168 | 2/1968 | Lucky | 333/18 |
| 3,508,153 | 4/1970 | Gerrish et al. | 325/42 |
| 3,537,038 | 10/1970 | Rich | 333/18 |
| 3,508,172 | 4/1970 | Kretzmer et al. | 333/18 |
| 3,553,606 | 1/1971 | Port | 333/18 |
| 3,571,733 | 3/1971 | Fang | 328/162 |

*Primary Examiner*—Malcolm A. Morrison
*Assistant Examiner*—James F. Gottman
*Attorney*—L. Lee Humphries, H. Fredrick Hamann and Edward Dugas

[57] ABSTRACT

The invention is directed to a system for automatically adjusting the multiple gain taps in a transversal equalizer so as to minimize the errors in a received signal caused by intersymbol interference and noise. In a preferred embodiment, the sign of a delayed replica of the sampled input signal is multiplied by the sign of a derived error signal to form an incremental signal, which signal is used to increment a selected gain tap in the transversal equalizer by a fixed amount and in a direction determined by the sign of the incremental signal. This type of procedure is applied to each of the tap-gains of the transversal equalizer to drive the $k^{th}$ tap-gain, for example, to the value that minimizes the cross-correlation function.

$$\sum_{j=-\infty}^{\infty} \rho_j h_{j-k}$$

where $\rho_j$ is the error in the $j^{th}$ sample of the system's pulse response as seen at the equalizer output and $h_{j-k}$ is the $(j-k)^{th}$ sample of the system's pulse response as seen at the equalizer's input. The derived error signal is formed by comparing the actual system's output signal with a computed desired signal, with the error signal being the difference between the two.

12 Claims, 8 Drawing Figures

INVENTOR.
EARL D. GIBSON
BY Edward Dugas
ATTORNEY

INVENTOR
EARL D. GIBSON
BY Edward Dugas
ATTORNEY

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON

BY Edward Dugas
ATTORNEY

AUTOMATIC TRANSVERSAL EQUALIZER SYSTEM

BACKGROUND OF THE INVENTION

With the advent of high speed communications systems utilizing hard wire transmission lines, problems have arisen with distortion and intersymbol interference caused by overlapping of the ringing signal of each transmitted bit with the signals for later and previously transmitted bits. Various methods and devices have been utilized to minimize these undesired effects. The main device of interest to the present application is the "Transversal Equalizer." The first transversal equalizer for the purpose of versatile correction of distortion, or intersymbol interference, in data transmission was devised by the present inventor in U.S. Pat. No. 3,274,582, entitled "Interdigit Interference Correction," filed Aug. 25, 1961, and assigned to ACF Industries, Inc.

A patent of particular interest is U.S. Pat. No. 3,414,819, entitled "Digital Adaptive Equalizer System," by R. W. Lucky. The Lucky patent is directed to a transversal equalizer in which each equalizer tap gain is adjusted to drive a corresponding sample of the transmission system pulse response to zero. Thus when the system's pulse response is sampled at the baud rate, all of the samples except one are driven towards zero by this equalizer. Three major limitations of the aforementioned device are: (1) when the intersymbol interference becomes strong, the automatic adjustment process fails. This occurs when the sum of the absolute amplitudes of the intersymbol interference terms exceeds the absolute amplitude of the desired pulse response sample; (2) with each tap gain adjusted to drive one corresponding intersymbol interference term to zero, when the intersymbol interference is strong, the equalizer causes interference terms beyond the range of the equalizer to grow large causing unsatisfactory performance; (3) under strong or moderate intersymbol interference, adjusting the gain taps according to the Lucky patent generally causes the random noise to be amplified much more than the desired signal component.

Applicant's system is based upon adjusting the $k^{th}$ tap-gain $g_k$ to the value that minimizes the cross-correlation function $$\sum_{j=-\infty}^{\infty} \rho_j h_{j-k} \qquad (1)$$

where $\rho_j$ is the error in the $j^{th}$ sample of the system's pulse response as seen at the equalizer output and $h_{j-k}$ is the $(j-k)^{th}$ sample of the system's pulse response as seen at the equalizer input.

This criterion of adjustment was derived to optimize the overall receiver performance under the combined effects of intersymbol interference and noise. Furthermore, this criterion leads to convergence of the automatic equalization process under several-fold larger distortion (or intersymbol interference) than Lucky's zero-forcing technique can tolerate. Note that this criterion of adjustment is quite different from Lucky's technique of adjusting each $g_k$ to drive a single $\rho_k$ toward zero. Also that this criterion takes into consideration all errors in the pulse response samples, all $\rho_j$ from $j=-\infty$ to $j=\infty$. For this reason, the equalizer adjusted according to this criterion does not cause some undesired intersymbol interference terms to grow large while others are being corrected, even when the intersymbol interference before equalization is strong.

The objectives stated above are achieved by incrementing each $g_k$ once each baud time by an increment $$\Delta g_{k,i} = k_i \,(\text{Sgn } Y_i)\, \text{Sgn } x_{i-k} \qquad \text{Eq. (2)}$$

such that each $g_k$ is driven to minimize the preceding cross-correlation function. Three variations to the increment approach are:

$$\Delta g_{k,i} = K_2\, Y_i\, \text{Sgn } x_{i-k} \qquad (3)$$

$$\Delta g_{k,i} = K3\, (\text{Sgn } Y_i)\, x_{i-k} \qquad (4)$$

$$\Delta g_{k,i} = K_4\, Y_i\, x_{i-k} \qquad (5)$$

where $K$ is a constant to obtain the desired increment size $x_{i-k}$ is a signal amplitude taken during the $(k-k)^{th}$ baud interval $Y_i$ is an error sample derived from the equalizer output.

Another patent of interest is U.S. Pat. No. 3,368,168, entitled "Adaptive Equalizer for Digital Transmission Systems Having Means to Correlate Present Error Component with Past, Present and Future Received Data Bits", by R. W. Lucky. In this patent, the scheme for adjusting each tap-gain (attenuator), first takes an analog error sample, multiplies it by a digit decision, passes the sequence of such sample products through a lowpass filter to obtain an approximate averaging (or integration) effect and then slices the lowpass filter output to obtain an error polarity signal, which is used to increment the tap-gain attenuator. Instead of using multiplication and filtering of analog qualities followed by slicing, the present invention uses digital quantities throughout. In the present invention, filters and slicers are eliminated and the attenuators in parallel are replaced by a time shared digital multiplier. The most important and most basic difference between Lucky's approach in U.S. Pat. No. 3,368,168 and the present invention is that he is correlating an error signal against digit decisions whereas the present system is correlating an error signal against the equalizer input signal and delayed replicas thereof. As a result, each tap-gain (or attenuator) in Lucky's approach is adjusted to drive one intersymbol interference term to zero. In the present system, each tap-gain is adjusted in a manner that takes into consideration all intersymbol interference terms from $-\infty$ to $+\infty$, even when the equalizer has only a small number of tap-gains. Furthermore, the present system, in effect, in adjusting each tap-gain, correlates all of the intersymbol interference terms against the effectiveness of that particular tap-gain in reducing each of the intersymbol interference terms. As mentioned previously, this adjustment procedure leads to a number of major capabilities and advantages not possessed by the equalizers of the referenced patents.

SUMMARY OF THE PRESENT INVENTION

The present invention is directed to an automatic equalizer system for minimizing intersymbol interference and noise in digital data communication systems. In a preferred embodiment of the present invention there is provided a means for sampling the received data signal to provide a signal proportional to the sign of the sampled signal and also to provide a signal proportional to the received data signal at the sample time. An N-tap delay line is connected to receive the sampled signals proportional to the received data signal and to delay the signals by N−1 intervals, the spacing of which corresponds to the reciprocal of the synchronous data symbol rate. A storage means is provided for generating N−1 delayed replicas of the sign of the sampled received signal. A multiplier means receives each of the replicas and a derived error signal to generate N increment product signals which are used to increment N gain factors such that the sampled signals from each of the N-taps of the delay line are multiplied by a related gain factor. Accumulator means are provided for summing the N-products, the sum of which corresponds to the system's output signal. Estimating means are provided for comparing the system's impulse response and the received digit to arrive at the error signal which is fed back to the multiplier means as the derived error signal.

In another embodiment of the invention, the sampled received data signal itself is fed to the storage means.

In still another embodiment of the invention, the sign of the derived error signal is used rather than the error signal itself. In related embodiments of the invention, combinations of the above are used to form the N increment product signals.

It is, therefore, a primary object of the present invention to provide a new and novel high speed system for receiving signals having intersymbol interference components.

It is another object of the present invention to provide a new and novel system for automatically adjusting the gain taps of an equalizer;

It is a further object of the present invention to provide a new and novel system which considers all intersymbol interference terms when adjusting a finite number of gain-taps.

It is still a further object of the present invention to provide a system which optimizes the overall system's performance under the combined effects of intersymbol interference and noise.

These and other objects of the present invention will become more apparent and better understood when taken in conjunction with the following description and drawings.

PREFERRED EMBODIMENTS OF THE INVENTION

Figure 1:
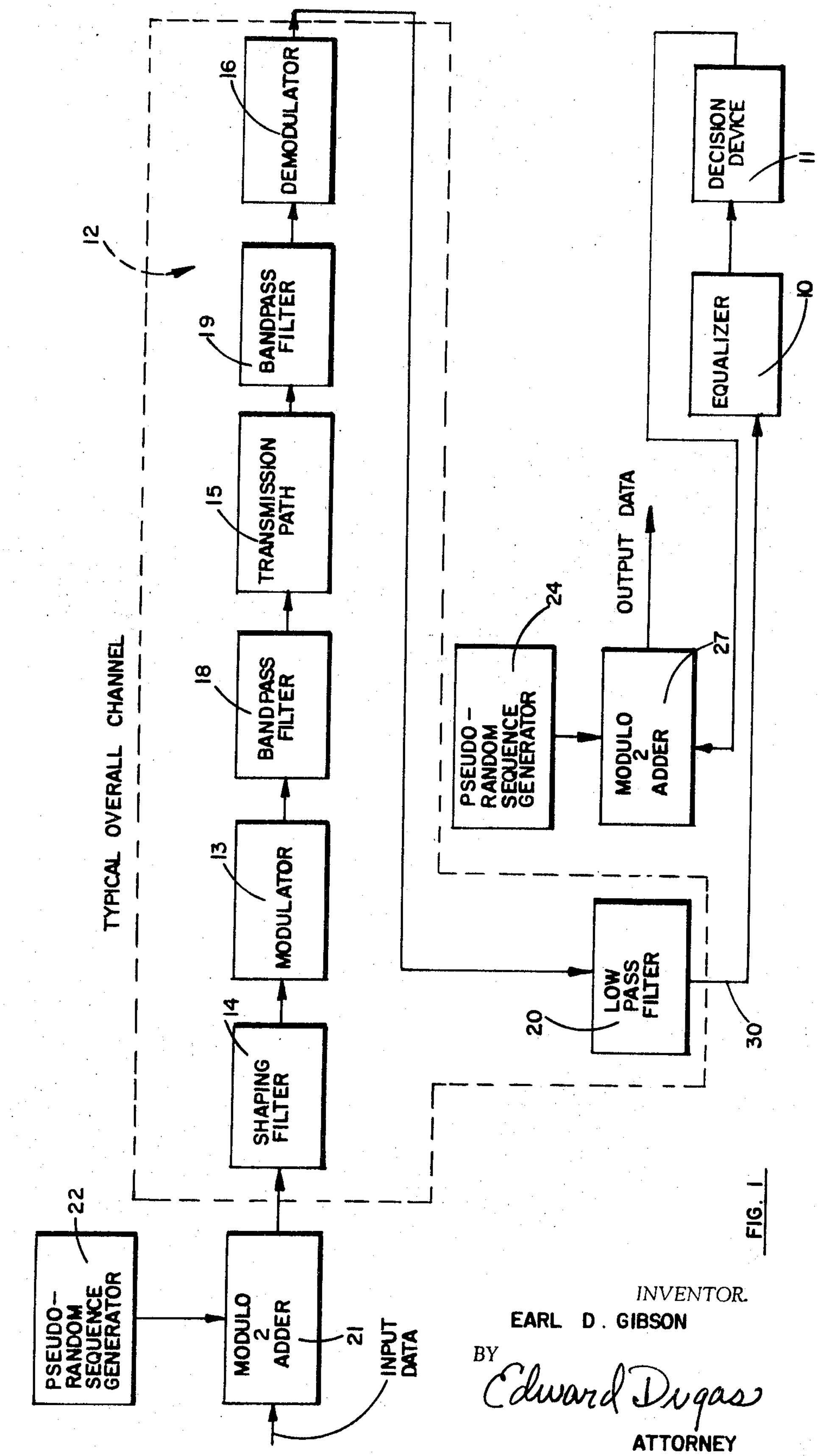
FIG. 1 illustrates in block diagram form a transmission channel which may be used effectively with the present invention.

FIG. 1 illustrates in block diagram form a typical transmission channel 12 to which the adaptive equalizer of the present invention may be attached to receive the output signal thereof. The transmission channel 12 is used in those applications where transmission must be made over a bandpass communication channel such as a voice grade communication line of the type used by telephone companies. Since digital data cannot ordinarily be transmitted directly on a voice communication line (since such paths are not adapted to handle DC signals), a system of modulators and demodulators is used. Typically, the input data, in digital form, which contains the information to be transmitted and, in some applications, the timing information, is fed to a shaping filter 14 which predistorts the digital data to better prepare it for transmission. The output of the shaping filter is fed to a modulator 13 which modulates this output by a carrier to produce an audio frequency output. The output signal from the modulator is then generally fed to a bandpass filter 18 in order to eliminate signal frequencies components unsuited to the transmission path 15 before application of the signal to this transmission path. In most applications, the passband of frequencies of filter 18 is best made approximately as wide as the band width of the transmission path 15. A second bandpass filter 19 receives the output from the transmission path 15 and eliminates those noise and extraneous signal components which fall outside the bandwidth of the transmission path. The received signal is then processed by demodulator 16 and the lowpass filter 20 to provide the received baseband signal 30 which is then applied to the transversal equalizer 10 of the present invention.

In most applications, it is desirable that the transmitted data be as nearly random as possible. Randomness of the data may be ensured by combining the digital information to be transmitted with the output of a digital pseudo-random sequence generator in a MODULO-2 adder. MODULO-2 addition of a pseudo-random sequence with the input information will produce a data sequence which itself is random. To recover the original information, the corrected received signal may be combined with the output of an identical pseudo-random sequence generator in another MODULO-2 adder. The apparatus for accomplishing the randomizing is shown in FIG. 1 as MODULO-2 adders 21 and 27, along with identical pseudo-random sequence generators 22 and 24. The design and operation of pseudo-random sequence generators is well known to those skilled in the art, and is described, for example, in the reference "Digital Communications with Space Applications", by S. M. Golomb et al., Prentice-Hall, New Jersey (1964). The decision device 11 examines the amplitude of the signal at the output of the equalizer (or samples of this signal amplitude) to estimate the values of each received digit.

The received baseband 30 contains the received data in a distorted form due to the overall impulse response characteristics of the transmission channel 12. In a particular transmission channel, the individual components of the signal distorting characteristics may be known and thus readily compensated for. The distortion characteristics of the transmission path 15 are generally unknown prior to transmission and, in most cases, change with time during transmission. The amplitude-frequency and delay-frequency characteristics of the transmission path 15 result in considerable distortion of the transmitted modulated digital signal. If consecutive data bits are fed to the transmission channel 12 at a sufficiently slow rate, the ringing associated with each bit will have an opportunity to die out before transmission of the next bit. With high speed transmission rates, the received baseband signal experiences considerable distortion due to interference with the ringing signals created by previously and subsequently transmitted pulses and with waveform distortion caused by changes in the characteristics of the transmission path. The pulse (or single-digit) response of the variable channel 12 is of basic importance to the automatic equalization process and is referred to herein as the "system pulse response before equalization."

Figure 2:
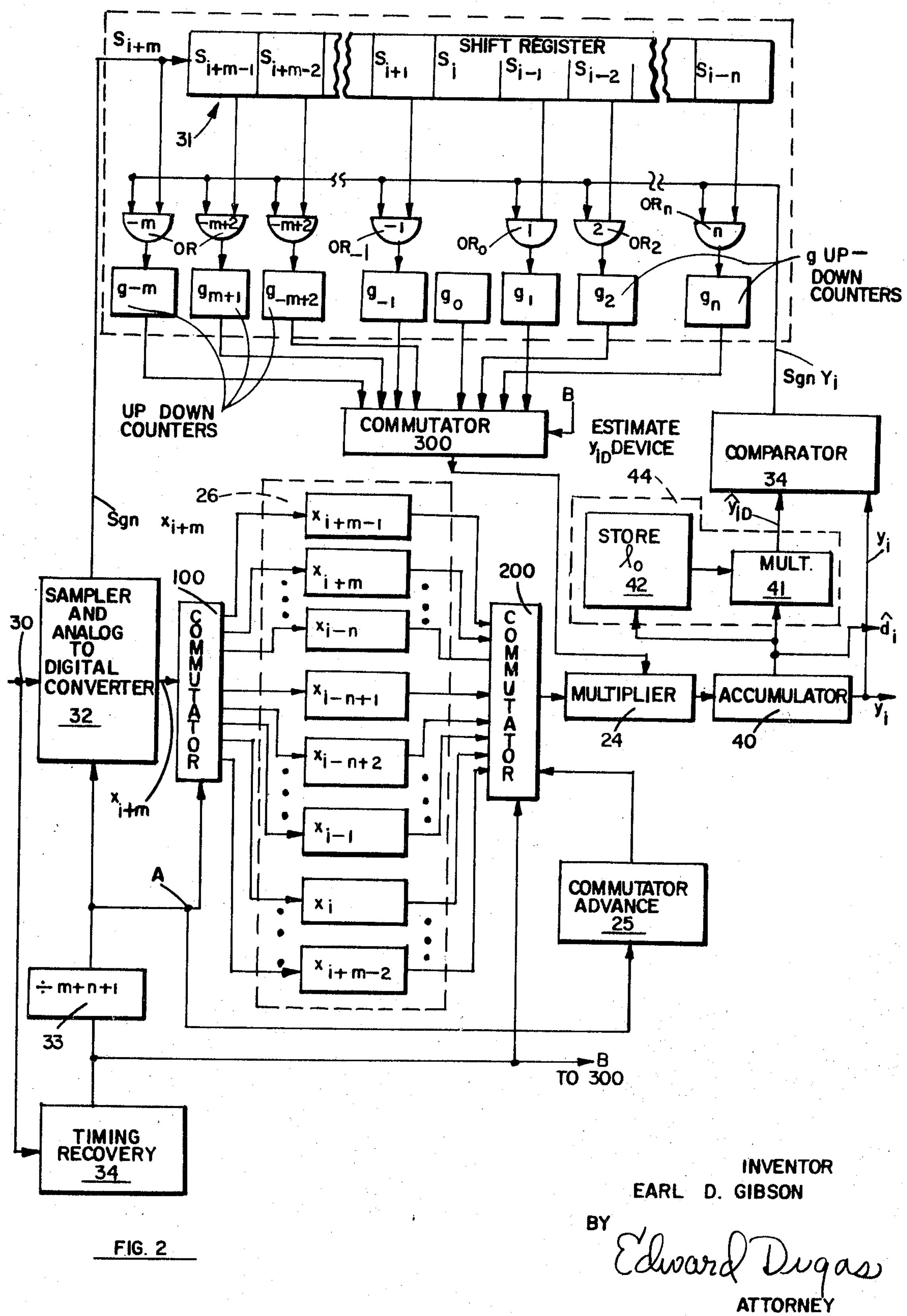
FIG. 2 illustrates in block diagram form the preferred system embodiment of the present invention.

Referring to FIG. 2 wherein is shown a digital implementation of the automatic transversal equalizer system of the present invention; the received baseband signal 30 enters a sampler and analog-to-digital converter 32. This device samples the received signal once per baud time and converts each sample amplitude to a binary number expressed as $x_{i+m}$. The sampler timing is controlled so that sampling occurs near the main peak of the system's pulse response. Although the received digital signals overlap in time because of distortion and intersymbol interference, the signal is sampled once near the main peak of the received signal component produced by each transmitted digit (or symbol). Ordinarily, a quantization accuracy of 12 bits or less is required for each sample. The timing (sample rate) of the sampler is controlled by timing pulses received from the frequency divider 33 as generated by the timing recovery circuit 34. The timing recovery device contains a stable clock and frequency divider chain and synchronizes the output of this frequency divider chain with zero-crossings of the received signal. Since these zero-crossings contain "time jitter," averaging over several zero-crossings (or the approximate equivalent of such averaging) is used to establish the correct synchronism of the timing recovery output. This type of timing recovery is well known and has been used in data modems such as the Autonetics ADEM modem. In FIG. 2 the output of the timing recovery is a synchronized pulse train at a pulse rate equal to N times the baud rate of transmission where N is the number of stages (or top-gains) of the equalizer. The frequency divider 33, when interposed between the timing recovery block 34 and the sampler and analog-to-digital converter 32, divides the timing recovery signal frequency such that one timing pulse is provided per baud interval at point A. Timing pulses having a rate equal to N times the transmitted baud rate are then provided at point B. A delay line 26 comprised of an $N = n + m + 1$ number of $x_i$ registers provide the require signal delays when digital implementation is desired for the system, where $m$ is the number of stages preceding the main tap-gain and $n$ is the number of stages following the main tap-gain. In the case of analog implementation, the $x_i$ registers are replaced with a multiple tap delay line. Each of the $x_i$ registers has an input and an output terminal.

The numbers $m$ and $n$ are determined by the severity of inter-symbol interference and the precision of equalization required in a particular application. When the part of the system pulse response following the main peak is longer than the part preceding the main peak, the equalizer contains more gain-taps preceding the main gain-tap than following this main gain-tap, a feature which differs from previous automatic equalizers. For 9,600 bits-per-second transmission over leased voice-band telephone channels, we use $m = 14$, $n = 6$, for example.

A commutator 100, which may be an electronic switching device, connects the output of the sampler and analog-to-digital converter 32 sequentially to the inputs of the $x_i$ registers in response to the timing pulses from the frequency divider circuit 33 at point A. The commutator 100, therefore, switches at the rate of one position per baud time interval from register $x_{i+m-1}$ to the next lower register in FIG. 2. Each of the $x_i$ registers stores one signal sample in the form of a binary number. The number of bits needed in each binary number depends upon the application and is approximately eight to 12 bits in the operating embodiment shown. When a new sample is read into an $x_i$ register, the old sample is eliminated. During each baud interval, the latest arriving signal sample replaces the signal sample which has been stored the longest. This occurs in only one register during a given baud interval. Then during the next baud interval, the next sample is read into the next lower $x_i$ register, replacing the old signal sample in that register. There are $n + m + 1$ of the $x_i$ registers and, at the particular commutator time (position) shown in FIG. 2, these registers store signal samples $x_{i-n}$ through $x_{i+m}$ which will be used to evaluate the $i^{th}$ transmitted digit $d_i$. During the last baud time, sample $x_{i+m}$ has been read into the second register from the top in FIG. 2, replacing sample $x_{i-n-i}$ in that register. One baud time later these $x_i$ registers will contain $x_{i-n+i}$ through $x_{i+m+i}$ which will be used to evaluate the $(i+1)^{th}$ transmitted digit $d_{i+1}$. To implement the digital equivalent of an N-tap transversal equalizer, $n + m + 1$ is set equal to N. A commutator 200 is connected between multiplier 24 and the outputs of the $x_i$ registers. In response to the timing signal from the timing recovery circuit 34 at point B, commutator 200 switches at N times the baud rate to cover all of its N positions during a baud interval. This commutator is positioned such that it starts in the position of a signal sample that has been stored the longest, that is, during each baud interval it starts one position lower than during the previous baud interval. Commutator 200 is advanced $n + m + 1$ times per baud by the input of the frequency divider 33 and is advanced once more per baud by the output of the frequency divider 33 which output is fed to the commutator advance circuit 25. As previously stated, electronic switching circuits for commutators are well known in the prior art, thereby eliminating need for a more detailed description here.

The sign of the sampled baseband signal 30 from the sampler and analog-to-digital converter 32 is fed to an $n + m$ stage shift register 31. The output of each stage of the shift register 31 is connected to one input terminal of a corresponding subscript numbered exclusive OR gate $OR_{-m}$ through $OR_n$. The input to the OR gate $OR_{-m}$ comes directly from the sign signal, Sgn $x_{i+m}$, out of the sampler and analog-to-digital converter circuit 32. The second input signal, Sgn $Y_i$, fed to each of the exclusive OR gates comes from a comparator circuit 34. The output from each OR gate is connected to a corresponding subscript lettered UP-DOWN counter $g_{-m}$ through $g_n$. The output of the commutator 300 is connected as an input to multiplier 24 which operates to multiply the input from commutator 200 with the input from commutator 300 to form a product signal which is applied to accumulator 40.

The $g$-counters store binary numbers representing the tap gain settings of the transversal equalizer $g_{-m}$ through $g_n$. During a given baud interval, for example, while commutator 200 is scanning $x_{i-n}$ through $x_{i+m}$, commutator 300 is scanning $g_n$ through $g_{-m}$ in synchronism; and, these $g$'s are read into multiplier 24. Multiplier 24 multiplies $g_n$ times $x_{i-n}$, $g_{n-i}$ times $x_{i-n+}$, etc. The accumulator 40 accumulates all of these products for a baud interval to obtain, in binary form $$y_i = \sum_{k=-m}^{n} g_k x_{i-k}. \qquad (6)$$

The output from the accumulator 40 is a sequence of binary numbers (about six to 12 bits per number, depending upon the application) in which each number represents one instantaneous amplitude sample of the equalized signal, where one sample is taken per received baud. The output can, however, be put in other forms by using additional circuitry, as explained below. The $i^{th}$ sample, $y_i$, is the sample from which the $i^{th}$ digit, $d_i$, is evaluated. The $(i+1)^{th}$ equalized signal sample, for example, is $$y_{i+1} = \sum_{k=-m}^{n} g_k x_{i-k+1} \qquad (7)$$

and is the sample from which the digit $d_{i+1}$ is evaluated. Note that the commutators are so synchronized that $g_0$, for example, is multiplied by $x_i$ when evaluating $y_i$ and by $x_{i+1}$ when evaluating $y_{i+1}$.

Since accumulator 40 is a typical digital accumulator, we can also read out of it the digit decisions. For example, when using conventional Q-level signaling, where $Q = 2^q$ and $q$ is an integer, the $q$ most significant bits in $y_i$ represent $\hat{d}_i$, the receiver's evaluation of $d_i$, and these $q$ bits can be read directly out of the accumulator. The $\hat{d}_i$ output, along with the $y_i$ output, is fed to an estimating circuit 44 which provides as an output a signal $y_{iD}$ which is proportional to the estimated product of the $i^{th}$ digit $d_i$ and the pulse response sample $l_o$, separated from the total signal $y_i$. The $y_{id}$ signal is fed to the comparator 34. The comparator circuit provides an output signal Sgn $Y_i$ which is indicative of the sign difference between the signals $y_{iD}$ and $y_i$.

We are now ready to consider operation of the adjustments of the equalizer; i.e., automatically setting the multiplication factors, g's, in the UP-DOWN counters 36 to values that combat the intersymbol interference and noise introduced by the transmission channel. For the instantaneous case shown in the drawings, the output signal sample $x_{i+m}$ is fed to the commutator 100 from the analog-to-digital converter 32. At this time, converter 32 also provides a one-bit binary output, Sgn $x_{i+m} = S_{i+m}$ to the shift register 31. Several previous values of the $\{S_i\}$ travel down the shift register, where $S_i$ is the polarity of the $i_{th}$ received signal sample with sampling at the baud rate. Each of the $\{S_i\}$ is fed from one stage of the shift register to one input of an exclusive OR gate.

During this time the estimated digit value, $\hat{d}_i$, from accumulator 40 enters multiplier 41 where it is multiplied by a constant, $l_o$, which equals the amplitude sample of the main peak of the pulse response of the system including the equalizer. For the present it is assumed that $l_o$ is known apriori and can be treated as a constant. This assumption will be true in some applications where an automatic gain control external to the equalizer keeps $l_o$ constant to within the accuracy required, although it will be necessary in some applications for the receiver to continually learn and update $l_o$, as explained below.

Assuming $\hat{d}_i$ is correct, $(\hat{d}_i = d_i)$, the output of multiplier 41 at the $i^{th}$ baud time is a digital representation of $y_{iD}$, the desired value of the equalizer output signal sample $y_i$. In other words, the correct output of multiplier 41 is $y_{iD}$, the value of $y_i$ that would be obtained in the case of a distortionless, noise-free channel. The comparator 34 compares $y_i$ with $y_{iD}$ and generates a binary output signal Sgn $Y_i$, where $Y_i = y_i - y_{iD}$. The comparator output is a binary mark when $y_i - y_{iD}$ is positive and is a binary space when $y_i - y_{iD}$ is negative. This comparator 34 can be a binary adder that simply determines the most significant bit of $y_i - y_{iD}$. This most significant bit represents Sgn $Y_i$, which is fed to the exclusive OR gates.

Each exclusive OR gate 32 receives two single-bit binary numbers. The exclusive OR gate associated with $g_k$, for example, receives the two binary numbers Sgn $Y_i$ and $S_{i-k}$. The output of this exclusive OR gate is a binary space when Sgn $Y_i = S_{i-k}$, and is otherwise a binary mark. This exclusive OR gate causes the associated UP-DOWN counter to count down by one count when Sgn $Y_i = S_{i-k}$ (when the exclusive OR output is a binary space) and to count up by one count when Sgn $Y_i = S_{i-k}$.

Thus, with the exception of $g_o$, each equalizer gain factor, each $g$, is incremented up or down by a tiny increment once each baud time. Some of the increments are in the wrong direction, but the $g$'s are driven generally in the correct direction so that after an initial learning period the $g$'s will be driven to within a few increment sizes of the optimum values. By making the increment size very tiny with respect to $g_o$, accurately optimized adjustments are obtained.

The gain factor $g_o$ is fixed and stored in the counter labeled $g_o$. The equivalent of making the increment size on each of the other $g$'s very tiny is to make $g_o$ equal to a large count in any one of the UP-DOWN counters. The larger this count, the slower and more precise the equalization becomes. The best trade-off between speed and precision depends upon the application. For fast and fairly precise equalization, set $g_o$ equal to a count of approximately $2^{10}$ in each of the UP-DOWN counters. For slow and highly precise equalization, set $g_o$ equal to a count of approximately $2^{15}$ in each of the UP-DOWN counters. This iterative, incremental method of driving the $g$'s in the UP-DOWN counter constitutes automation of the equalizer.

In the above discussion we have assumed that the gain factor $g_o$ is fixed and the decision threshold levels of the decision device are adjusted properly for this fixed $g_o$, either by automatically adjusting these decision threshold levels or using a suitable AGC ahead of the equalizer. Instead, the gain factor $g_o$ could be automatically adjusted by the same method used for the other gain factors and fixed decision threshold could be used. Then, $g_o$ and the other gain factors would automatically adjust to these fixed threshold levels provided these levels are approximately correct initially.

Figure 3:
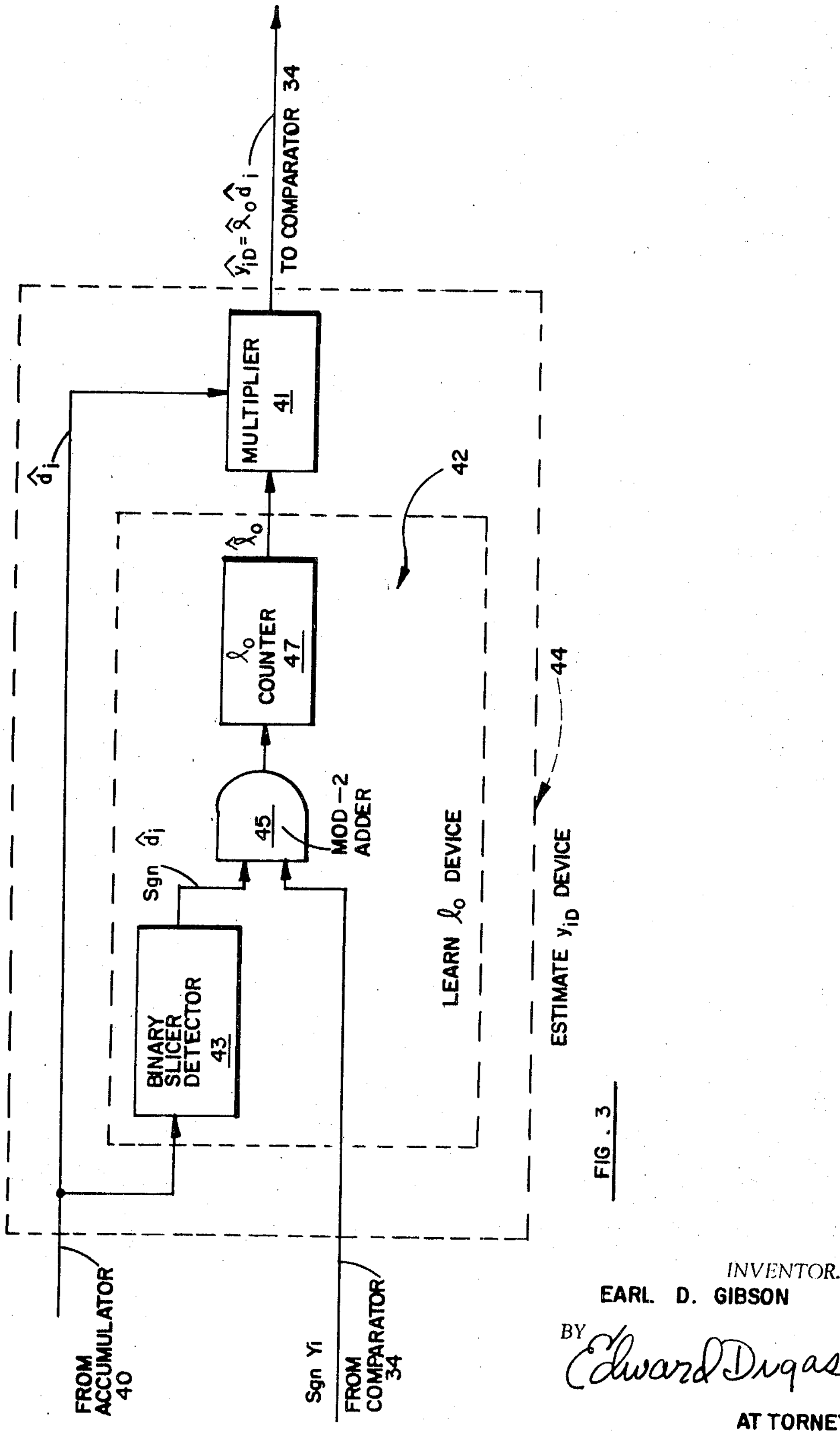
FIG. 3 illustrates in block diagram form a first estimate device which may be used with the preferred embodiment of FIG. 2.

Referring to FIG. 3 wherein a more detailed block diagram of the estimate $y_{iD}$ device 44 is shown for applications in which it is necessary to learn $l_o$, the signal $\hat{d}_i$ from accumulator 40 is fed to a binary slicer detector 43 and also to the multiplier 41. The detector 43 determines the sign of the received signal $\hat{d}_i$ and generates an output pulse which gives a binary representation of the polarity of $\hat{d}_i$ to a MODULO-2 adder 45. With binary signaling Sgn $\hat{d}_i = \hat{d}_i$ and detector 43 can be eliminated. Even in multilevel signaling, accumulator 40 could be arranged to output Sgn $\hat{d}_i$ and detector 43 could be eliminated. The signal Sgn $Y_i$ from comparator 34 is fed to the MODULO-2 adder 45. The two Sgn signals, Sgn $y_i$ and Sgn $\hat{d}_i$, are added, producing the incremental signal (Sgn $Y_i$)(Sgn $\hat{d}_i$) which is fed to the $l_o$ counter 47. This signal is an indication of the polarity of the error in the last previous estimate of $l_o$, which is stored in the $l_o$ counter, and this signal is used to add or delete one count from the $l_o$ counter in the direction that reduces the error in the estimated $l_o$. After many small increments, mostly correct, the estimate of $l_o$ becomes accurate. The blocks 43, 45 and 47 comprise the learn $l_o$ means 42. The multiplier 41 multiplies the output of $l_o$ counter 47 by the estimated digit value $\hat{d}_i$ to obtain the output signal $y_{iD} = \hat{l}_o\hat{d}_i$.

The following is an explanation of how the objectives stated above are accomplished by this incrementing procedure.

The $i$th equalizer input signal sample is $$x_i = \sum_{\text{all } l} h_l d_{i-l}. \quad (8)$$

The $i^{th}$ equalizer output signal sample is $$y_i = \sum_{\text{all } j} l_j d_{i-j}. \quad (9)$$

For any one of many possible types of signalling, the desired value of $y_i$ is $$y_{iD} = \sum_{\text{all } j} l_{jD} d_{i-j}, \quad (10)$$

where $l_{jD}$ is the $j^{th}$ sample of the desired system pulse response. The error in the $i^{th}$ sample of the equalizer output signal is $$Y_i = y_i - y_{iD} = \sum_{\text{all } j} e_j d_{i-j}, \quad (11)$$

where $$\rho_j = l_j - l_{jD}. \quad (12)$$

From equations (8) and (11)

$$Y_i x_i{}^+{}_k = (\ldots + \rho_{-2}d_{i+2} + \rho_{-1}d_{i+1} + \rho_0 d_i + \rho_1 d_{i-1} + \rho_2 d_{i-2} + \ldots) \quad (13)$$
$$(\ldots + h_{-2}d_{i-k+2} + h_{-1}d_{i-k+1} + h_0 d_{i-k} + h_1 d_{i-k-1} + h_2 d_{i-k-2} + \ldots)$$

The transmitted pulses representing the digit values $d$'s +are antipodal and statistically balanced around zero. For example, if the possible digit values are 0, 1, 2, 3, we represent these values by transmitted pulses of amplitudes −3, −1, 1 and 3, respectively, where the mean frequency of occurrence of a pulse of given amplitude is approximately equal to the mean frequency of occurrence of a pulse of the same absolute amplitude but opposite polarity.

Now, with random or pseudo-random antipodal data, which is guaranteed if necessary by placing a data randomizer in the transmitter and a derandomizer in the receiver, the statistical average of the product $Y_i x_{i-k}$ is $$\overline{Y_i x_{i-k}} = \sum_{\text{all } j} \rho_j h_{j-k} K \quad (14)$$

where $K$ is a constant. This fact can be verified from equation (13) by noting that, because of the statistically balanced antipodal signaling, data product terms of the form $d_i d_j$ average to zero except when $i = j$ and average to the mean $\overline{d_i^2}$ when $i = j$. From the correlation function expression in the abstract, we now note that a measure of the quantity to be minimized by adjusting the $k^{th}$ tap-gain $g_k$ could be obtained by averaging $Y_i x_{i-k}$ over many samples.

However, suppose we take the product $Y_i x_{i-k}$ once each baud interval and increment $g_k$ by a small increment $$\Delta g_{k,i} = k_o(Y_i x_{i-k}),\ k_o \text{ a small constant}. \quad (15)$$

Because of the random data terms and noise, many of the individual increments will be quite inaccurate; but, the use of many small increments will essentially constitute an averaging process and, because of the statistical relationship given by equation (14), will drive each tap-gain, $g_k$, to approximately the desired value.

Since we need only drive each tap-gain in the proper direction, the fixed-size-increment process expressed by equation (2) or the incrementing processes expressed by equations (3) and (4) will also drive each $g_k$ to approximately the desired value.

It is important also to note the following matrix which expresses the pulse response samples at the equalizer output, $l$'s, in terms of the pulse response samples at the equalizer input, $h$'s, and the tap gains, $g$'s.

| | | | | | | | | | | | |
|---|---|---|---|---|---|---|---|---|---|---|---|
| ⋮ | | ⋮ | ⋮ | ⋮ | ⋮ | ⋮ | ⋮ | ⋮ | ⋮ | ⋮ | |
| $g_{-1}$ | . . . | $h_{-2}$ | $h_{-1}$ | $h_0$ | $h_1$ | $h_2$ | $h_3$ | $h_4$ | $h_5$ | $h_6$ | . . . |
| $g_0$ | . . . | $h_{-3}$ | $h_{-2}$ | $h_{-1}$ | $h_0$ | $h_1$ | $h_2$ | $h_3$ | $h_4$ | $h_5$ | . . . |

| | | | | | | | | | | | |
|---|---|---|---|---|---|---|---|---|---|---|---|
| $g_1$ | ... | $h_{-4}$ | $h_{-3}$ | $h_{-2}$ | $h_{-1}$ | $h_0$ | $h_1$ | $h_2$ | $h_3$ | $h_4$ | ... |
| $g_2$ | ... | $h_{-5}$ | $h_{-4}$ | $h_{-3}$ | $h_{-2}$ | $h_{-1}$ | $h_0$ | $h_1$ | $h_2$ | $h_3$ | ... |
| . | | . | . | . | . | . | . | . | . | . | |
| . | | . | . | . | . | . | . | . | . | . | |
| | ... | $l_{-3}$, | $l_{-2}$, | $l_{-1}$, | $l_0$, | $l_1$, | $l_2$, | $l_3$, | $l_4$, | $l_5$ | ... |
| | ... | $t_{-3}$, | $t_{-2}$, | $t_{-1}$, | $t_0$, | $t_1$, | $t_2$, | $t_3$, | $t_4$, | $t_5$ | ... time. |

Note that when a given tap-gain $g_k$ is adjusted by an increment $\Delta g_k$, the effect upon the $j$th output sample $l_j$ is $\Delta g_k h_{j-k}$. Therefore, $h_{j-k}$ is a measure of the effectiveness of each tap-gain adjustment $\Delta g_k$ in correcting the error $\rho_j$ in the equalizer output pulse response sample $l_j$. Thus, our criterion for the $k^{th}$ tap-gain adjustment, as expressed in Eq. (1), is to correlate the sequence of error terms, the $\{e_j\}$, with the effectiveness of this tap-gain in reducing these error terms. Taking the effectiveness of each tap-gain into consideration in this correlation process of adjustment prevents any tap-gain from being driven to a large value while contributing very little toward reduction of the intersymbol interference and thereby controls the noise gain of the equalizer. These considerations indicate that this adjustment process is a means for approximately minimizing the combined effects of all intersymbol interference terms and the noise, a fact which has been verified by extensive analyses and computer simulation.

Figure 4:
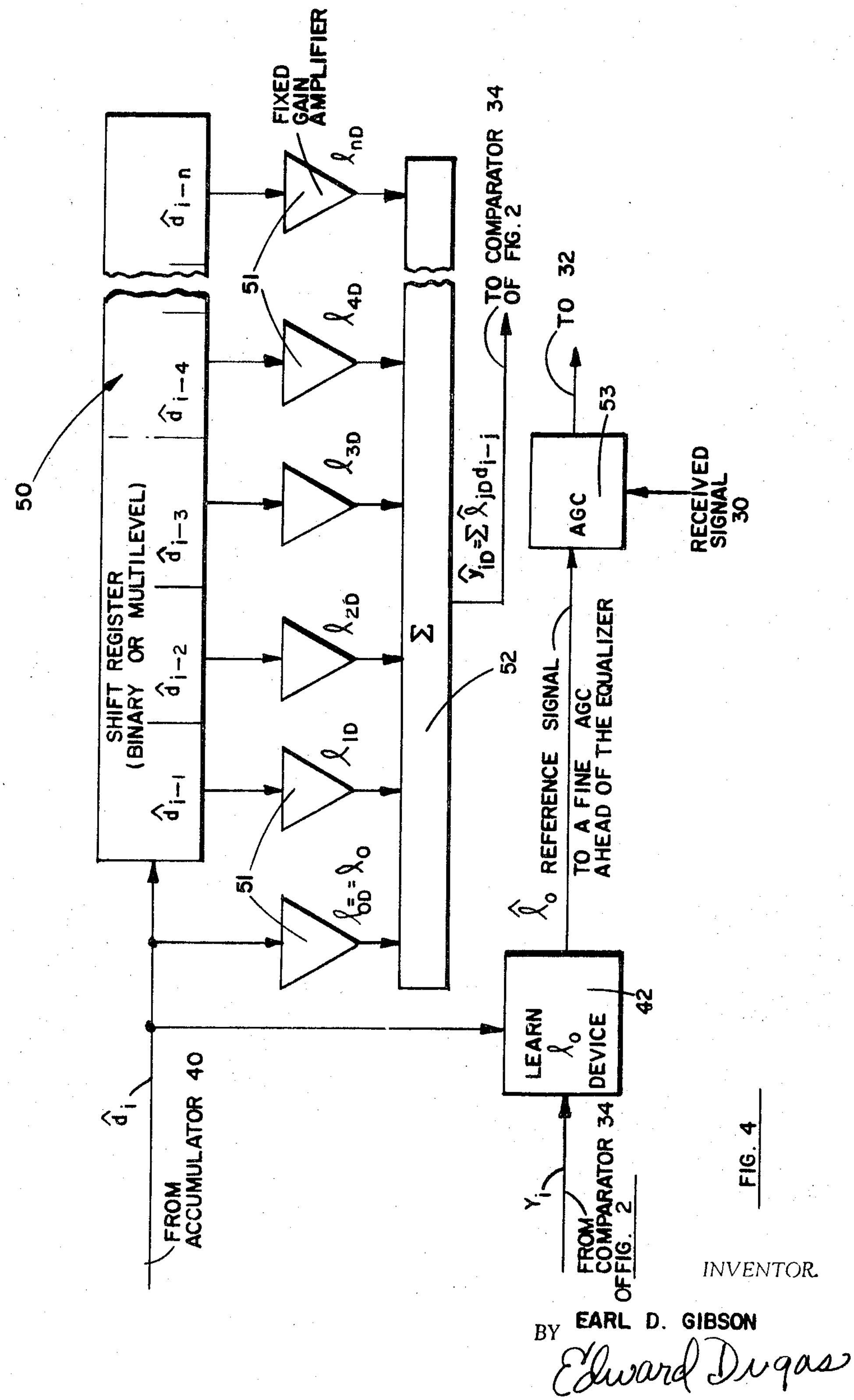
FIG. 4 is a block diagram of a second embodiment of an estimate device which may be used with the preferred embodiment of FIG. 2.

FIG. 4 illustrates an alternate embodiment of the estimate $Y_{tD}$ device 44 of FIG. 2. The digit decision $\hat{d}_t$ from accumulator 40 enters the multi-stage shift register 50. For the case of $Q$-level signaling (where $Q = 2^q$) the shift register 50 must be the equivalent of a $Q$-level register, possibly using $q$ stages per digit. The shift register is the digital equivalent of a delay line which is capable of delaying the digits by one baud interval per stage.

The digit decisions enter the shift register at the baud rate; and, at any given time, the last $n$ preceding digit decisions are in the shift register. At the time the digit decision $\hat{d}_t$ appears at the shift register input, the decision $\hat{d}_{t-j}$, $o \leq j \leq n$ (for all integer values of $j$ between $o$ and $n$) is multiplied by a fixed, preset gain factor $l_{jD}$. Fixed-gain amplifiers 51, digital multipliers, or resistive adder networks, can be used to provide the fixed-gains, or attenuations. The outputs of the fixed-gain amplifiers are summed together in summer 52 to provide the output $y_{tD}$.

The digit decision $d_t$ and the signal $Y_t$ from the comparator 34 of FIG. 2 enter the learn $l_o$ device 42. This learn $l_o$ device is identical to the learn $l_o$ device of FIG. 2. The output from the learn $l_o$ device is is the output signal $\hat{l}_o$, which is an estimate of $l_o$. The estimate $\hat{l}_o$ is fed as a reference signal to a fine AGC control which is positioned in front of the sampler and analog-to-digital converter 32 to control the amplitude of the baseband signal 30 received by converter 32. The AGC control 53 then controls the mean signal level of $\hat{d}_t$ and $Y_t$ to maintain $l_o$ at a fixed preselected level so that all of the fixed gains of amplifier 51 will be correct, i.e., so that the received signal level will correspond to the scale factor used in the fixed settings.

Alternate methods of signal transmission and receiving include the methods of partial response signaling which utilize controlled intersymbol interference. For each partial response signaling method, there is a code that can be used to prevent the controlled intersymbol interference from causing a burst of errors in the final output digit decisions. For any one of these signaling methods, the performance and simplicity of the learn $y_{tD}$ device 44 can be improved compared to the arrangement in FIG. 4 by directly using the type of digit in which no error propagation exists. With the exception of the learn $Y_{tD}$ device, the automatic equalizer previously described above applies to any partial response signaling scheme.

In general, we define a digit (or symbol) $D_t$ such that $$l_{oD}D_t = \sum_j l_{jD}d_{t-j} = y_{tD},\ D_t = \frac{1}{l_{oD}}y_{tD} \qquad (16)$$

where the summation is over the complete sequence of $\{l_{jD}\}$ used in any particular partial response scheme. Ordinarily, a partial response receiver evaluates the $\{D_t\}$ directly instead of the $\{d_t\}$. The controlled intersymbol interference associated with the $\{l_{jD}\}$ causes no error propagation in the $\{D_t\}$.

Figure 5:
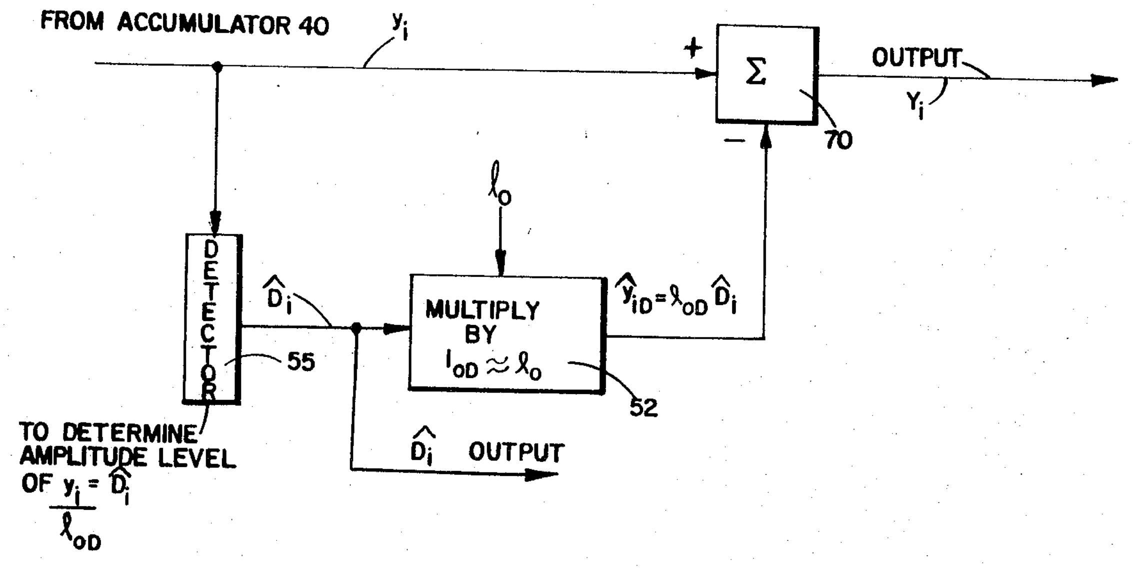
FIG. 5 illustrates in a block diagram form a third embodiment of an estimate device to be used in the embodiment of FIG. 2 when partial response signaling is used.

With no loss of generality we can assume $l_{oD} = l_o$ and, in some applications, an AGC operating independently of the equalizer can keep $l_o$ sufficiently near a constant value (known apriori) to eliminate the need for the learn $l_o$ device. Then, the estimate $Y_{tD}$ device becomes simply a multiplier that multiplies $\hat{D}_t$ by the constant $$l_{qD} \approx l_o;$$

as shown in FIG. 5. The signal $y_t$ is fed to a decision device 55 to determine the amplitude level of $y_t$, quanitized to the o number of levels as the number of possible values of $D_t$, which quantitized amplitude level is the signal $\hat{D}_t$. The decision device estimates the signal $D_t$ from the amplitude level of $y_t$ when $D_t$ is a known function of the transmitted digits $d_t$ for any particular type of partial response signal. The entire adjustable automatic equalizer can then operate with any partial response signaling scheme in which $l_o$ is known in advance with sufficient accuracy. The signal $l_o$ is stored and multiplied by the signal $\hat{D}_t$ in multiplier 52. The multiplier could be eliminated by designing the detector (or multilevel slicer) so that its output signal level equals $l_o\hat{D}_t$. The summation device 70 subtracts the multiplier output $\hat{y}_{tD}$ from $y_t$ to obtain the error signal $Y_t$ which is fed to multipliers which replace the exclusive OR gates of FIG. 2. The equipment in FIG. 5 replaces the estimate $Y_{tD}$ device 44 and the comparator 34 of FIG. 2 when we wish to use a tap-gain adjustment increment size proportional to the error $Y_t$ instead of a fixed tap-gain increment size.

In most high performance data modems requiring precise equalization, it will be necessary to learn $l_o$ or some associated scale factor such as one of the other $l_{jD}$. Several methods of learning $l_o$ in partial response schemes are available.

Figure 6:
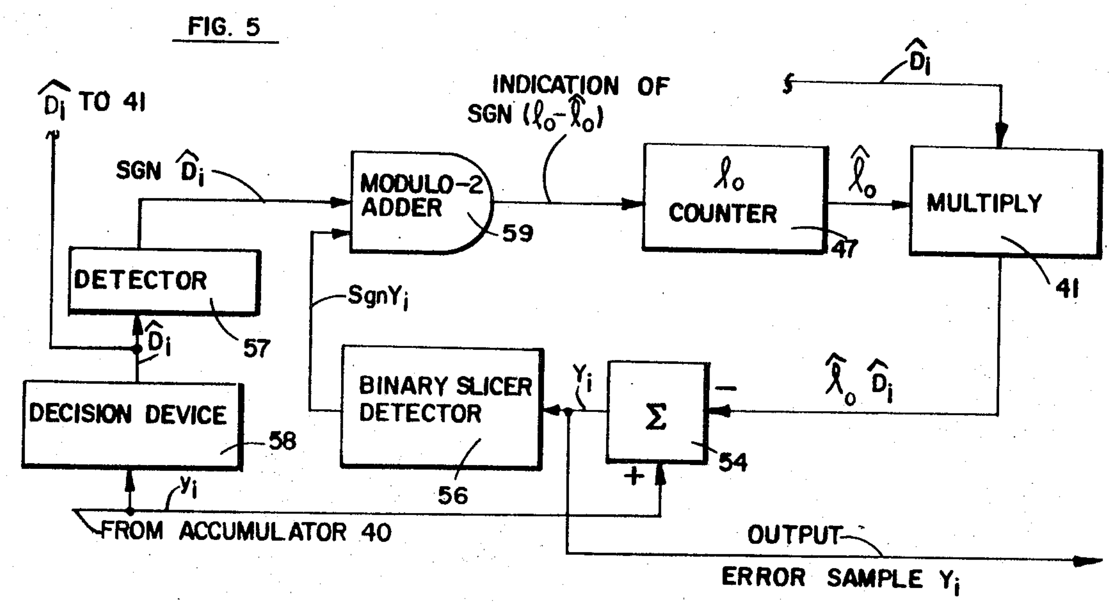
FIG. 6 illustrates in block diagram form a fourth embodiment of an estimate device to be used in the embodiment of FIG. 2 when partial response signaling is used.

FIG. 6 illustrates one method of learning $l_o$ and the error sample $Y_t$. The signal sample, $y_t$, from the output of accumulator 40 is fed to the summation means 54. Let us assume at first that $$y_t \approx l_o D_t. \qquad (17)$$

At the beginning of equalization, this approximation is sometimes very innacurate; but the learned $l_o$ is still driven in the correct direction on a statistical basis. The summation means 54 subtracts from $y_t$ the estimate signal $$\hat{y}_{tD} = \hat{l}_o \hat{D}_t \qquad (18)$$

the generation of which will be described. The output of the summation means 54 is the signal $$Y_t = \hat{y}_t - y_{tD} \approx l_o D_t - \hat{l}_o \hat{D}_t. \qquad (19)$$

We can assume that $D_t$ is correct most of the time; and, when it is correct $$Y_t \approx (l_o - \hat{l}_o) D_t. \qquad (20)$$

From equation (20) it can be seen that for most samples $$\text{Sgn } Y_t \text{ Sgn } D_t = \text{Sgn } (l_o - \hat{l}_o).$$

Next, the signal $Y_t$ goes to a binary slicer detector 56 which generates a binary output representing Sgn $Y_t$. Decision device 58 receives the signal $y_t$ and provides the output signal $\hat{D}_t$ to the Sgn detector 57. The sign detector then provides the desired signal Sgn $D_t$ to the MODULO-2 adder. The MODULO-2 adder essentially multiplies Sgn $D_t$ by Sgn $Y_t$. Therefore, if we increment the estimate $\hat{l}_o$ by a very small increment once per baud in the direction indicated by Sgn $Y_t$ Sgn $D_t$, most of the increments will be in the direction that reduces $l_o - \hat{l}_o$; and, our estimate $\hat{l}_o$ will eventually become accurate if the increment size is kept sufficiently small. This incrementing of $\hat{l}_o$ is accomplished by using the output of the MODULO-2 adder to increment the $l_o$ counter 47 once per baud in the direction indicated by Sgn $Y_t$ Sgn $D_t$. The multiplier 41 multiplies $\hat{l}_o$ from the $l_o$ counter 47 by $D_t$ from the detector 57 to obtain $\hat{y}_{tD} = \hat{l}_o \hat{D}_t$, which is fed back to the summation means 54.

The device in FIG. 6 replaces the estimate $y_{tD}$ device 44 and the comparator 34 of FIG. 2. The internally generated $\hat{D}_t$ replaces the input $\hat{d}_t$ and the output is $Y_t$ instead of Sgn $Y_t$. The error sample $Y_t$ can be used instead of Sgn $Y_t$ in applications where speed and precision of equalization are important enough to warrant the extra expense by using multipliers instead of the exclusive OR gates of FIG. 2.

In most of the above discussions we have assumed a fixed increment size in the learning of the $\{g_k\}$ and $l_o$. In each of the above variations of the implementation we can make the increment size proportional to the estimated error in the adjustment of the learned quantity. With the proportional increment size, the learning can proceed very rapidly near the beginning of operation when the errors are large and then become highly precise later because, as the errors converge towards zero, the increment size becomes very tiny. In addition to noise, there are various error terms such as $l_j\, l_k\, d_i\, d_k$, $j \neq k$, in the expressions utilized for learning. Each of these error terms has a mean of zero but a variance that depends upon the length of averaging, integration, or correlation used to reduce this variance. With a tiny increment we essentially apply very long-term integration (or correlation) to reduce the effects of noise and the variance of the undesired terms to very low values.

Figure 7:
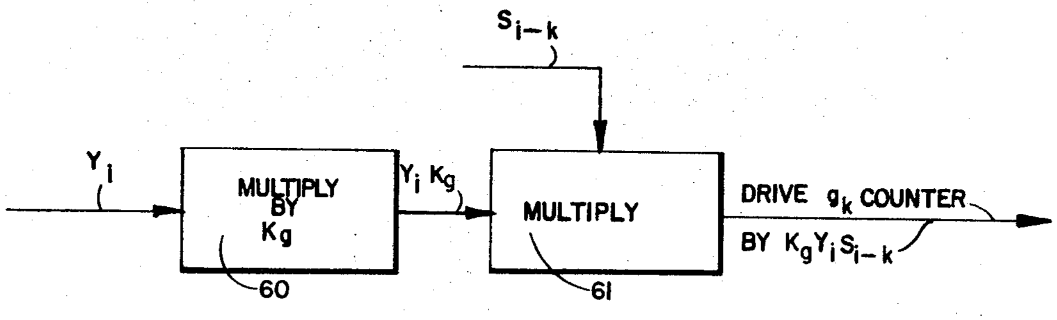
FIG. 7 illustrates in block diagram form a device for providing proportional incrementing in the embodiment of FIG. 2.

The system in FIG. 2 can be modified for proportional increment learning of the $\{g_k\}$ by removing the exclusive OR gates and replacing each of the OR gates with the device shown in FIG. 7. The signal $Y_i$ from the summation device 70 of FIG. 5 or the summation device 54 of FIG. 6 enters the multiply by $k_g$ means 60. Multiply means 60 multiplies the variable amplitude signal sample $y_i$ by the preselected constant $k_g$. Within wide limits the smaller we make $k_g$ the wider the range of conditions under which the initial learning coverages and the more precise, but slower, the learning becomes. A value of $k_g$ that has proven generally desirable is $2^{-7}$ on a scale where $g_o = 1$. Next, the quantity $Y_i\, k_g$ is multiplied by the binary number $S_{i-k}$ from the corresponding stage of the shift register 31 by multiplier 61 to determine the size and polarity of the increment by which the $k^{th}$ UP-DOWN counter $g_k$ of FIG. 2 is to be incremented. The output of the multiplier must, of course, be in the same digital format as needed for the output of the respective UP-DOWN counter.

An alternative to making the increment size proportional to $Y_i$ is to make it proportional to $x_{i-k}$.

For most purposes where very fast learning is not required, a fixed increment size provides performance very nearly equivalent to a proportional increment size and results in less expensive implementation. Under typical conditions, fairly precise learning can be obtained in about 50 to 100 milliseconds with a proportional increment and in about one-fourth to one-half second with a fixed increment.

An important alternative is to use a relatively large fixed increment during the first 50–500 milliseconds of the initial learning and then switch to a very small fixed increment size for accurate continuous adaptation.

In some applications, it will be desirable to use only a few transversal equalizer stages for economic reasons. Sometimes coarse equalization can be tolerated and, in other cases, the coarse transversal equalizer can be followed by a less expensive type of equalizer that completes the equalization job. However, with coarse equalization, the techniques for learning $l_o$ described above will sometimes not be sufficiently accurate because the accuracy of learning $l_o$ depends upon the accuracy with which the equalizer minimizes the undesired intersymbol interference terms. The following method can provide accurate learning of $l_o$ without requiring accurate equalization.

This approach depends upon $l_o$ being the largest $l_j$ in absolute magnitude. When any other $l_j$ predominates we can apply this approach to that $l_j$ since we need to learn only one $l_j$ to establish a scale factor for any of the general automatic equalization schemes. When two or more of the largest $l_j$ are nearly equal and coarse equalization is to be used, the following approach can be used.

This approach is based on the fact that when $l_o$, for example, is the predominate $l_j$, $$\widetilde{y_i(\text{Syn } y_i)} \approx k l_o \quad (21)$$

where $\sim$ denotes averaging over many signal samples and $k$ is a constant.

Figure 8:
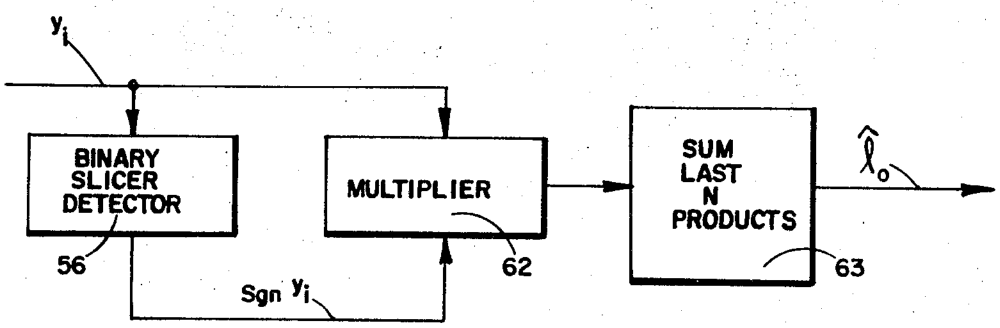
FIG. 8 illustrates in block diagram form a device for learning a major sample of the system pulse response which may be used with the embodiment of FIG. 2.

FIG. 8 shows one method of learning $l_o$ under these conditions. The equalizer output signal sample $y_i$ goes to the binary slicer detector 56 which converts $y_i$ into Syn $y_i$. Next, $y_i$ is multiplied by Syn $y_i$ multiplier 62 and the product goes to the summing device 63. The summing device 63 sums the last N products from the last N signal samples. For accuracy, N should be approximately 1,000 or more. Except for a scale factor the sum is equivalent to the average called for by Eq. (21).

The implementation expense can be reduced by using a long-term integrator instead of the summing device, since the long-term integral and long-term sum are essentially equivalent.

I claim:

1. In a data receiver for receiving a waveform corresponding to a train of transmitted pulses, transmitted at a baud rate:

means for sampling the received signal to provide a sampled signal where the $i^{th}$ sample is $x_i = \Sigma_k h_k d_{i-k}$ and the $(i+m)^{th}$ sample is $x_{i+m} = \Sigma_k h_k d_{i+m-k}$ and where $h_k$ = $k^{th}$ sample of the system pulse response before equalization $d_{i-k}$ = the received digit at the $i-k^{th}$ baud time, said sampling means also providing a signal Sgn $x_{i+m}$ indicative of the sign of the signal $x_{i+m}$;

an N-tap delay line connected to receive said sampled signal $x_{i+m}$, said delay line having a total time delay of N−1 baud intervals of delay, where N is at least two;

commutator means for sequentially sampling the signal at each of said taps;

storage means receiving said Sgn $x_{i+m}$ signal and generating N−1 delayed replicas of this signal, the $k^{th}$ replica being Sgn $x_{i-k}$;

first multiplier means for receiving N-2 of these N−1 delayed replicas and the undelayed signal Sgn $x_{i+m}$ and an error signal Sgn $Y_i$ for providing N−1 product signals $\Delta_{g_{k,i}} = K \text{ Sgn } Y_i \text{ Sgn } x_{i-k}$ where $-m \leq k \leq m$, $N = m+n+1$ and K is a constant;

means for generating one fixed gain factor and N−1 variable gain factors in response to said $\Delta_{g_{k,i}}$ signals once each baud time, where the increment of the $k^{th}$ gain during the $i^{th}$ baud time is the signal $\Delta_{g_{k,i}}$, where $m$ is the number of gain factors preceding said fixed gain factor and $n$ is the number of gain factors following said fixed gain factor;

second multiplier means for multiplying the sampled signal from said commutator by a corresponding one of the said N gain factors to form N products;

accumulator means for summing the formed N products each baud time to generate an output signal $$y_i = \sum_{k=-m}^{n} g_k x_{i-k}$$

where $g_k$ is the $k$th gain factor said accumulator means also generating a signal $\hat{d}_i$ which is an estimate of the $i$th transmitted digit from the $q$ most significant bits in the accumulator means when each received digit can assume $2^q$ values;

means for storing a signal $l_o$ which signal is proportional to the mean of the product of $y_i\hat{d}_i$; and error sample generator means receiving the signals $\hat{d}_i$ and $y_i$ from said accumulator means and the signal $l_o$, for forming the product $l_o\hat{d}_i$ and for subtracting said product from the signal $y_i$ to form the signal $Y_i$ the sign of which is the signal Sgn $Y_i$ which is fed to said first multiplier means as an error signal.

2. In a data receiver for receiving a waveform corresponding to a train of transmitted pulses, transmitted at a baud rate:

means for sampling the received signal to provide a sampled signal where the $i^{th}$ sample is $x_i = \Sigma_k h_k d_{i-k}$ and the $(i+m)^{th}$ sample is $x_{i+m} = \Sigma_k h_k d_{i+m-k}$ and where $h_k$ = $k^{th}$ sample of the system pulse response before equalization $d_{i-k}$ = the received digit at the i−$k^{th}$ baud time;

an N-tap delay line connected to receive said sampled signal $x_{i+m}$, said delay line having a total time delay of N-1 baud intervals of delay, where N is at least one;

commutator means for sequentially sampling the signal at each of said taps;

storage means receiving $x_{i+m}$ signal and generating N-1 delayed replicas of this signal, the $k^{th}$ replica being $x_{i-k}$;

first multiplier means for receiving N-2 of these N-1 delayed replicas and the undelayed signal $x_{i+m}$ and an error signal Sgn $Y_i$ for providing N-1 product signals $\Delta_{g_{k,i}} = K \text{ Sgn } Y_i \text{ Sgn } x_{i-k}$ where $-m \le k \le m$, $N = m+n+1$ and $K$ is a constant;

means for generating one fixed gain factor and N-1 variable gain factors in response to said $\Delta_{g_{k,i}}$ signals once each baud time, where the increment of the $k^{th}$ gain during the $i^{th}$ baud time is the signal $\Delta_{g_{k,i}}$, where $m$ is the number of gain factors preceding said fixed gain factor and $n$ is the number of gain factors following said fixed gain factor;

second multiplier means for multiplying the sampled signal from said commutator means by a corresponding one of the said N gain factors to form N products;

accumulator means for summing the formed N products each baud time to generate an output signal $$y_i = \sum_{k=-m}^{n} g_k x_{i-k}$$

where $g_k$ is the $k$th gain factor said accumulator means also generating a signal $\hat{d}_i$ which is an estimate of the $i$th transmitted digit from the $q$ most significant bits in the accumulator means when each received digit can assume $2^q$ values;

means for storing a signal $l_o$ which signal is proportional to the mean of the product of $y_i\hat{d}_i$; and error sample generator means receiving the signals $\hat{d}_i$ and $y_i$ from said accumulator means and the signal $l_o$, for forming the product $l_o\hat{d}_i$ and for subtracting said product from the signal $y_i$ to form the signal $Y_i$ the sign of which is the signal Sgn $Y_i$ which is fed to said first multiplier means as an error signal.

3. In a data receiver for receiving a waveform corresponding to a train of transmitted pulses, transmitted at a baud rate:

means for sampling the received signal to provide a sampled signal where the $i^{th}$ sample is $x_i = \Sigma_k h_k d_{i-k}$ and the $(i+m)^{th}$ sample is $x_{i+m} = \Sigma_k h_k d_{i+m-k}$ and where $h_k$ = $k^{th}$ sample of the system pulse response before equalization $d_{i-k}$ = the received digit at the $i-k^{th}$ baud time, said sampling means also providing a signal Sgn $x_{i+m}$ indicative of the sign of the signal $x_{i+m}$;

an N-tap delay line connected to receive said sampled signal $x_{i+m}$, said delay line having a total time delay of N-1 baud intervals of delay, where N is at least two;

commutator means for sequentially sampling the signal at each of said taps;

storage means receiving said Sgn $x_{i+m}$ signal and generating N−1 delayed replicas of this signal, the $k^{th}$ replica being Sgn $x_{i-k}$;

first multiplier means for receiving N−2 of these N−1 delayed replicas and the signal Sgn $x_{i+m}$ and an error signal $Y_i$ for providing N−1 product signals $\Delta_{g_{k,i}} = K \text{ Sgn } x_{i-k}$ where $-m \le k \le m$, $N = m+n+1$ and $K$ is a constant;

means for generating one fixed gain factor and N−1 variable gain factors in response to said $\Delta_{g_{k,i}}$ signals once each baud time, where the increment of the $k^{th}$ gain during the $i^{th}$ baud time is the signal $\Delta_{g_{k,i}}$, where $m$ is the number of gain factors preceding said fixed gain factor and $n$ is the number of gain factors following said fixed gain factor;

second multiplier means for multiplying the sampled signal from said commutator means by a corresponding one of the said N gain factors to form N-products;

accumulator means for summing the formed N products each baud time to generate an output signal $$y_i = \sum_{k=-m}^{n} g_k x_{i-k}$$

where $g_k$ is the $k$th gain factor said accumulator means also generating a signal $\hat{d}_i$ which is an estimate of the $i$th transmitted digit from the $q$ most significant bits in the accumulator means when each received digit can assume $2^q$ values;

means for storing a signal $l_o$ which signal is proportional to the mean of the product of $y_i\hat{d}_i$; and error sample generator means receiving the signals $\hat{d}_i$ and $y_i$ from said accumulator means and the signal $l_o$, for forming the product $l_o\hat{d}_i$ and for subtracting said product from the signal $y_i$ to form the signal $Y_i$ which signal is fed to said first multiplier means as an error signal.

4. The receiver according to claim 3 wherein said error sample generator means is comprised of:

a decision device for receiving the output signal $y_i$ and for providing an estimate $\hat{D}_i$ of a quantity $D_i$ from the amplitude level of the signal $y_i$ where $D_i$ is a known function of the transmitted digits $d_i$;

multiplier means receiving the stored signal $l_o$ and for forming the product $l_o \hat{D}_i = \hat{y}_{iD}$; and subtraction means for receiving the signal $y_i$ and for subtracting the signal $\hat{Y}_{iD}$ therefrom to form the error signal $Y_i$.

5. The invention according to claim 3 wherein said error sample generator means is comprised of:

decision means for receiving the signal $y_i$ from said accumulator means and for forming therefrom the signal $\hat{D}_i$, which is an estimate of a quantity $D_i$, where $D_i$ is a known function of the transmitted digits $d_i$;

detector means receiving the signal $D_i$ and for forming therefrom the signal Sgn $\hat{D}_i$;

summation means for receiving the signal $y_i$ and for subtracting therefrom the signal $l_o\hat{D}_i$ to form the error sample signal $Y_i$;

detector means for receiving the signal $Y_i$ and forming therefrom the signal Sgn $Y_i$;

a MODULO-2 adder for adding the signal Sgn $\hat{D}_i$ and Sgn $Y_i$ to form a difference signal;

counter means for receiving said difference signal and forming an output proportional to the count in said counter means, which count is the signal $\hat{l}_o$, which signal is the estimate of the signal $l_o$; and multiply means for multiplying the signal $D_i$ from said decision means with said count signal $\hat{l}_o$ to form the product $\hat{l}_o\hat{D}_i$ which product signal is fed to said summation means.

6. In a data receiver for receiving a waveform corresponding to a train of transmitted pulses, transmitted at a baud rate;

means for sampling the received signal to provide a sampled signal where the $i^{th}$ sample is $x_i = \Sigma_k h_k d_{i-k}$ and the $(i+m)^{th}$ sample is $x_{i+m} = \Sigma_k h_k d_{i+m-k}$ and where $h_k$ = $k^{th}$ sample of the system pulse response before equalization $d_{i-k}$ = the received digit at the $i-k^{th}$ baud time;

an N-tap delay line connected to receive said sampled signal $x_{i+m}$, said delay line having a total time delay of N−1 baud intervals of delay, where N is at least two;

commutator means for sequentially sampling the signal at each of said taps;

storage means also receiving said $x_{i+m}$ signal and generating therefrom N−1 delayed replicas of this signal, the $k^{th}$ replica being $x_{i-k}$;

first multiplier means for receiving N−2 of these N−1 delayed replicas and said $x_{i+m}$ signal and an error signal $Y_i$ for providing N−1 product signals $\Delta_{g_{k,i}} = K\, Y_i\, x_{i-k}$ where $-m < k < n$, $N = m+n+1$ and $K$ is a constant;

means for generating one fixed gain factor and N−1 variable factors in response to said $\Delta_{g_{k,i}}$ signals once each baud time, where the increment of the $k^{th}$ gain during the $i^{th}$ baud time is the signal $\Delta_{g_{k,i}}$, where $m$ is the number of gain factors preceding said fixed gain factor and $n$ is the number of gain factors following said fixed gain factor;

second multiplier means for multiplying the sampled signal from said commutator means by a corresponding one of the said N-gain factors to form N-products;

accumulator means for summing the formed N products each baud time to generate an output signal $$y_i=\sum_{k=-m}^{n} g_k x_{i-k}$$

where $g_k$ is the $k^{th}$ gain factor said accumulator means also generating a signal $\hat{d}_i$ which is an estimate of the $i^{th}$ transmitted digit from the $q$ most significant bits in the accumulator means when each received digit can assume $2^q$ values;

means for storing a signal $l_o$ which signal is proportional to the mean of the product of $y_i\hat{d}_i$; and error sample generator means receiving the signals $\hat{d}_i$ and $y_i$ from said accumulator means and the signal $l_o$, for forming the product $l_o\hat{d}_i$ and for subtracting said product from the signal $y_i$ to form the signal $Y_i$, which signal is fed to said first multiplier means as an error signal.

7. In a data receiver for receiving a waveform corresponding to a train of transmitted pulses, transmitted at a baud rate:

means for sampling the received signal to provide a sampled signal where the $i^{th}$ sample is $x_i=\Sigma_k h_k d_{i-k}$ and the $(i+m)^{th}$ sample is $x_{i+m}=\Sigma_k h_k d_{k+m}-k$ and where $h_k$ = $k^{th}$ sample of the system pulse response before equalization $d_{i-k}$ = the received digit at the $i-k^{th}$ baud time, said sampling means also providing a signal Sgn $x_{i+m}$ indicative of the sign of the signal $x_{i+m}$;

an N-tap delay line connected to receive said sampled signal $x_{i+m}$, said delay line having a total time delay of N−1 baud intervals of delay, where N is at least two;

commutator means for sequentially sampling the signal at each of said taps;

storage means receiving said Sgn $x_{i+m}$ signal and generating N−1 delayed replicas of this signal, the $k^{th}$ replica being Sgn $x_{i-k}$;

first multiplier means for receiving N−2 of these N−1 delayed replicas and said Sgn $x_{i+m}$ signal and an error signal Sgn $Y_i$ for providing N−1 product signals $\Delta_{g_{k,i}}=K$ Sgn $Y_i$ Sgn $x_{i-k}$ where $-m \leq k \leq n$, $N=m+n+1$ and $K$ is a constant;

means for generating one fixed gain factor and N−1 variable gain factors in response to said $\Delta_{g_{k,i}}$ signals once each baud time, where the increment of the $k^{th}$ gain during the $i^{th}$ baud time is the signal $\Delta_{g_{k,i}}$, where $m$ is the number of gain factors preceding said fixed gain factor and $n$ is the number of gain factors following said fixed gain factor;

second multiplier means for multiplying the sampled signal from said commutator means by a corresponding one of the said N-gain factors to form N-products;

accumulator means for summing the formed N-products each baud time to generate an output signal $$y_i=\sum_{k=-m}^{n} g_k x_{i-k}$$

where $g_k$ is the $k^{th}$ gain factor said accumulator means also generating a signal $d_i$ which is an estimate of the $i^{th}$ transmitted digit from the $q$ most significant bits in the accumulator means when each received digit can assume $2^q$ values;

means for generating a signal $l_o$ which signal is proportional to the mean of the product of $y_i\hat{d}_i$; and wherein said means includes a first detector receiving the signal $\hat{d}_i$ and generating a signal Sgn $\hat{d}_i$;

a MODULO-2 adder receiving the signal Sgn $\hat{d}_i$ and signal Sgn $Y_i$ and generating therefrom the binary product Sgn $\hat{d}_i$ Sgn $Y_i$;

a storage means having stored therein an estimate of the signal $l_o$ for receiving each generated binary product so as to update the estimate of $l_o$ by a small increment proportional to said binary product; and error sample generator means receiving the signals $\hat{d}_i$ and $y_i$ from said accumulator means and the signal $l_o$, for forming the sum-product signal $y_{iD}=l_o d_i$ = amplitude of main pulse sample and transmitted digit and for subtracting said sum-product signal from the signal $y_i$ to form the signal $Y_i$ the sign of which is the signal Sgn $Y_i$ which is fed to said first multiplier means as said error signal.

8. The invention according to claim 7 wherein said error sample generator comprises:

a multistage shift register or delay line for receiving the signal $\hat{d}_i$ at the baud rate;

a plurality of fixed gain amplifiers, the number of which is one greater than the number of stages of said shift registers, one of said fixed gain amplifiers connected to receive said signal $\hat{d}_i$ and the remainder connected one each to a corresponding one stage of said shift register, the gains of each of said amplifiers fixed proportional to a sample of a transmission system pulse response at the output of said equalizer;

summation means for summing the outputs from each fixed gain amplifier to form the sum-product signal $y_{iD}$;

automatic gain control means interposed before said sampling means for adjusting the gain of said received signal in response to the generated signal $l_o$ so as to maintain the samples of transmission pulse responses at a fixed preselected level; and subtraction means for subtracting the signal $y_{iD}$ from the system's output signal $y_i$ to form the signal $Y_i$, the sign signal of which Sgn $Y_i$ is fed to said first multiplier means as said error signal.

9. An adaptive transversal equalizer for use with a data transmission system comprising in combination:

a transversal equalizer having a plurality of adjustable gain taps;

means for sampling the input signal fed to said transversal equalizer;

means for providing a digit value signal proportional to each received digit value;

means for comparing the transversal equalizer's output signal with said digit value signal to form an error signal equal to the difference between the two;

increment multiplier means for multiplying a delayed replica of said sampled input signal by said error signal to form an incremental signal which signal is fed back to a selected one of said adjustable tap to increment this tap gain by a fixed amount in a direction determined by the sign of the incremental signal so as to minimize the cross-correlation function $$\sum_{j=-\infty}^{\infty} \rho_j h_{j-k}$$

for the $k$th tap-gain $g_k$, where $\Sigma_j$ is the error in the $j$th sample of the system's pulse response as seen at the equalizer output and $h_{j-k}$ is the $(j-k)$th sample of the system's pulse response as seen at the equalizer's input.

10. The transmission system according to claim 9 wherein said means for providing a digit value signal is comprised of:

means for providing a signal estimated to be proportional to the amplitude of the largest sample of the impulse response of said transmission system;

a slicer detector receiving the output signal from said equalizer and providing an estimate signal of the digits contained in said equalizer output signal;

summing means for summing the output from said slicer detector with said error signal to provide an estimate of the sign of the error in the last previous estimate of the amplitude of the main sample of the impulse response of said transmission system; and counter means counting the sum of said estimated digits with said error signal to provide said digit value signal.

11. The invention according to claim 9 wherein said transversal equalizer is comprised of:

a first commutator means for receiving said sampled input signal, and for providing sequential outputs corresponding to each sample separated by the transmission baud intervals;

a plurality of register means, each connected to receive and store one sample of said input signal from said first commutator means;

output multiplier means;

a second commutator means for connecting sequentially each of the outputs of said plurality of register means in one baud interval to an input of said multiplier means and to advance the sequential connecting one register position for each baud interval;

a plurality of adjustable gain means for receiving said incremental signals and for providing signals proportional to the settings of said gain means; and a third commutator means for connecting sequentially each of said provided gain setting signals to said multiplier means during each baud interval, to form the product of each of said gain setting signals and said stored signals sampled so as to form the equalizer output.

12. The invention according to claim 9 wherein said increment multiplier means is comprised of:

an N-tap delay line for receiving said sampled input signal; and an N + 1 number of OR gates, one of said OR gates receiving as an input said sampled input signal, and the remainder of said OR gates each receiving the output from a corresponding one of said taps of said N-tap delay line and each OR gate receiving said error signal as an input with the output of said OR gates being said incremental signal.

* * * * *

PO-1050
(5/69)

UNITED STATES PATENT OFFICE
CERTIFICATE OF CORRECTION

Patent No. 3,651,316 Dated March 21, 1972

Inventor(s) Earl D. Gibson

It is certified that error appears in the above-identified patent and that said Letters Patent are hereby corrected as shown below:

Column 8, line 18 - Equation (11) should be corrected to read:

$$Y_i = y_i - y_{iD} = \sum_{\text{all } j} p_j d_{i-j}$$

Column 16, lines 50-53 - This equation should be corrected to read:

$$\sum_{j=\infty}^{\infty} p_j h_{j-k}$$

Column 16, line 54 - Correct "$\sum_j$" to read "$p_j$".

Signed and sealed this 29th day of August 1972.

(SEAL)
Attest:

EDWARD M. FLETCHER, JR.
Attesting Officer

ROBERT GOTTSCHALK
Commissioner of Patents

UNITED STATES PATENT OFFICE

CERTIFICATE OF CORRECTION

Patent No. 3,651,316 Dated March 21, 1972

Inventor(s) EARL D. GIBSON

It is certified that error appears in the above-identified patent and that said Letters Patent are hereby corrected as shown below:

In the prior Certificate of Correction:

Column 8, line 16, in Equation 11, the letter "p" should be -- $\ell$ --;
Column 16, lines 50-53, in the Equation, change the letter "p" to -- $\ell$ --;
Column 16, line 54, "$\mathcal{E}_j$" should be corrected to read -- $\ell_j$ --

* * * * * *

Column 1, line 72 (Equation 4) change "K3" to -- $K_3$ --;
Column 2, line 1, change "$(k-k)^{th}$" to -- $(i-k)^{th}$ --;
Column 4, line 67, "top" to -- tap --;
line 74, change "require" to -- required --;
Column 5, line 41 (one occurrence) and
line 42 (two occurrences) the subscript "$\ell$" should be the numeral -- 1 --;
Column 8, line 24 (Equation 13) the lefthand term should read -- $Y_i x_{i-k}$ --
Column 9, line 18, change "$\{e_j\}$" to -- $\{\ell_j\}$ --;
line 47, change "$Y_i$" to -- Sgn $Y_i$ --;

Column 10, lines 16-17, change "to the o number" to -- to the same numbe
line 51, (Equation 19) change "$\hat{y}_i - y_{iD}$" to -- $y_i - \hat{y}_{iD}$ --;

Column 11, line 29, change "coverages" to -- converges --;
In each of:
Claim 1, column 12, line 38 )
Claim 2, column 13, line 10 ) change "$-m \leq k \leq m$" to -- $-m \leq k \leq n$ --
Claim 3, column 13, line 63 )

Figure 2, with regard to the OR gate having the numeral "1" therewithin, change the label "$OR_0$" to -- $OR_1$ --.

Signed and sealed this 19th day of November 1974.

(SEAL)
Attest:

McCOY M. GIBSON JR.
Attesting Officer

C. MARSHALL DANN
Commissioner of Patents